United States Patent [19]

Marion et al.

[11] 4,411,671
[45] Oct. 25, 1983

[54] PRODUCTION OF SYNTHESIS GAS FROM HEAVY HYDROCARBON FUELS CONTAINING HIGH METAL CONCENTRATIONS

[75] Inventors: Charles P. Marion, Mamaroneck; Frederick C. Jahnke, Rye, both of N.Y.

[73] Assignee: Texaco Development Corporation, White Plains, N.Y.

[21] Appl. No.: 385,743

[22] Filed: Jun. 7, 1982

[51] Int. Cl.³ .............................................. C10J 3/46
[52] U.S. Cl. .................................. 48/197 R; 48/212; 48/215; 252/373
[58] Field of Search .................... 48/197 R, 212, 215, 48/206; 252/373

[56] References Cited

U.S. PATENT DOCUMENTS

| | | | |
|---|---|---|---|
| 3,620,700 | 11/1971 | Schlinger et al. | 48/215 |
| 3,951,617 | 4/1976 | Crouch | 48/215 |
| 3,998,609 | 12/1976 | Crouch et al. | 48/215 |
| 4,247,302 | 1/1981 | Woldy et al. | 48/197 R |
| 4,251,228 | 2/1981 | Muenger et al. | 48/197 R |

Primary Examiner—Peter F. Kratz
Attorney, Agent, or Firm—Carl G. Ries; Robert A. Kulason; Albert Brent

[57] ABSTRACT

Heavy liquid hydrocarbon fuel containing high metal concentrations and all of the soot rich in metal values that is produced in the system are feedstocks in a partial oxidation process. Three free-flow noncatalytic partial oxidation gas generators are simultaneously operated for the simultaneous continuous production of two streams of cleaned, raw synthesis gas having high and low $H_2O$/dry gas mole ratios, respectively. In the process, all of the hot, raw synthesis gas containing entrained particulate carbon and ash that is produced by the first two gas generators is quench cooled and scrubbed with water in separate quench tanks. Simultaneously, as stream of hot raw synthesis gas containing entrained particulate carbon and ash is produced by a third gas generator and cooled in a convection-type gas cooler without fouling and plugging of the tubes. All of the soot recovered from the quench cooling and scrubbing waters in the process is recycled to the first and/or second gas generator in admixture with the heavy hydrocarbon fuel.

10 Claims, 1 Drawing Figure

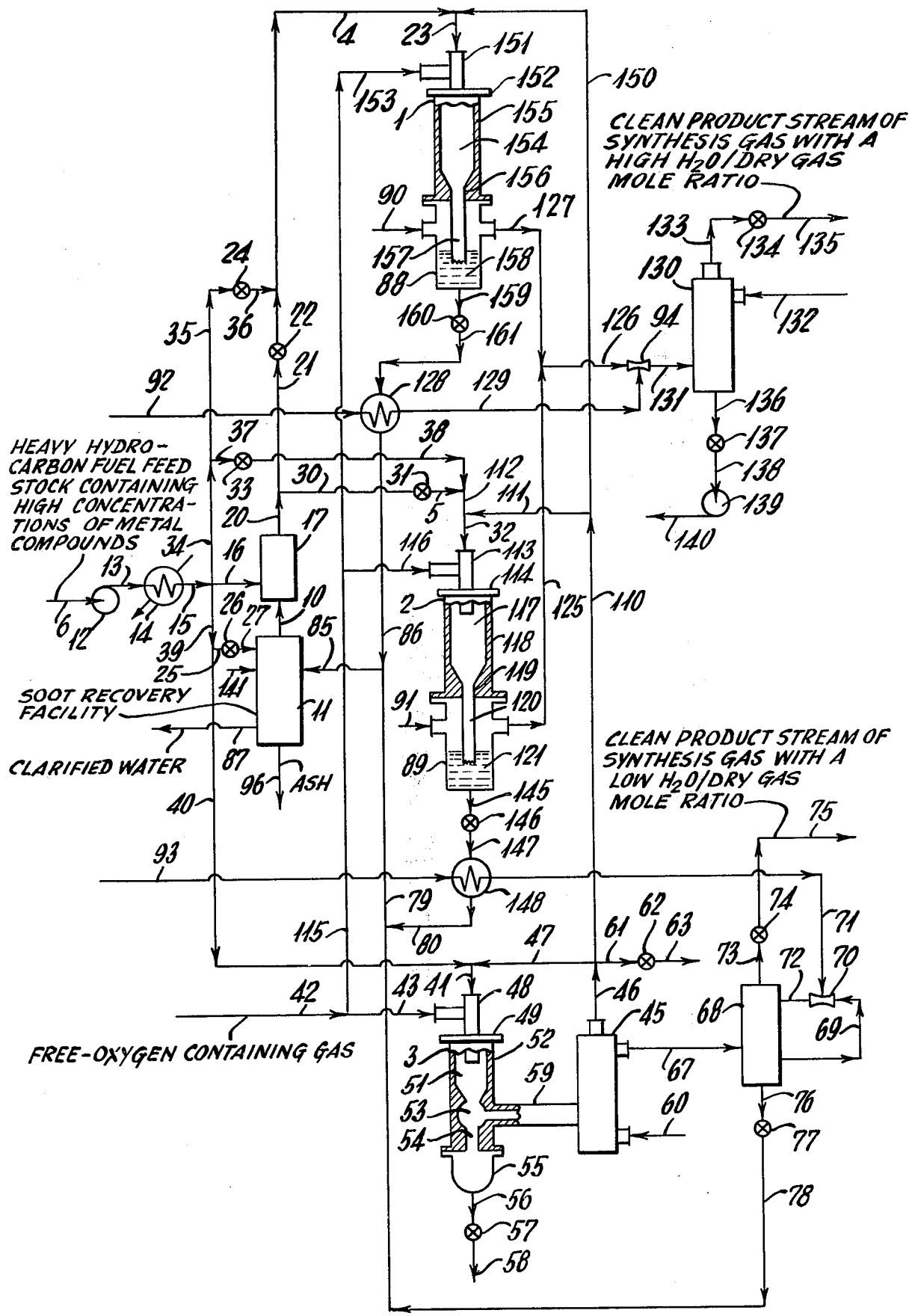

PRODUCTION OF SYNTHESIS GAS FROM HEAVY HYDROCARBON FUELS CONTAINING HIGH METAL CONCENTRATIONS

BACKGROUND OF THE INVENTION

This invention relates to the partial oxidation of a liquid hydrocarbon fuel to produce synthesis gas. More specifically, it relates to a process for simultaneously producing two clean product streams of synthesis gas, one gas stream with a high and the other gas stream with a low, $H_2O$/dry gas mole ratio by the partial oxidation of heavy hydrocarbon feedstocks containing high metal concentrations.

When a heavy liquid hydrocarbon fuel containing high metal concentrations such as vacuum resid is reacted by partial oxidation, entrained in the hot, raw gas stream is particulate carbon and ash, i.e., nickel, vanadium, and iron compounds. After the raw gas stream is cleaned free from particulate matter, it is economically desirable to dispose of the particulate carbon in the gas generator. However, recent commercial experience in gasifying heavy feed stocks containing high metal concentrations with 100% soot recycle has shown that the convection type gas coolers in the system may be then subject to shutdown because of fouling. Deposits may plug the gas cooler tube inlets or collect downstream in the low-temperature sections of the gas cooler tubes. These problems and others are now avoided by the subject invention.

The hot raw effluent gas stream from the reaction zone of a partial oxidation gas generator may comprise principally $H_2$, $CO$, $CO_2$, and $H_2O$ together with other gaseous constituents, and minor amounts of entrained particulate matter, i.e., particulate carbon and ash. The hot, raw effluent gas must be cooled and cleaned to produce synthesis gas or fuel gas. Synthesis gas is important commercially as a source of feed gas for the synthesis of hydrocarbons or oxygen containing organic compounds, or for producing hydrogen or ammonia.

Entrained particulate carbon and ash may be removed from the raw effluent gas by quenching and scrubbing with water such as described in coassigned U.S. Pat. No. 3,232,728. Cleaning the effluent gas by scrubbing with an oil-carbon slurry is described in coassigned U.S. Pat. No. 3,639,261. Recovery of the soot, from carbon-water dispersions in a carbon-recovery facility is described in coassigned U.S. Pat. Nos. 2,999,741; 2,992,906; 3,044,179; and 4,134,740. Typical decanting procedures are described in coassigned U.S. Pat. Nos. 3,980,592 and 4,014,786. These coassigned U.S. Patents are incorporated herein by reference.

SUMMARY

In accordance with the invention, the feedback to a partial oxidation process for the simultaneous continuous production of two streams of cleaned synthesis gas having high and low $H_2O$/dry gas mole ratios respectively may comprise a heavy, liquid hydrocarbon fuel containing high metal concentrations as well as all of the soot rich in metal values recovered in the process without plugging or fouling a convection-type gas cooler in the system.

Three free-flow noncatalytic refractory lined partial oxidation gas generators are used. All of the hot raw synthesis gas produced in the first and second gas generators is quench cooled and scrubbed with water in their respective quench tanks; and, simultaneously, all of the hot raw synthesis gas produced in the third gas generator is cooled in a convection-type gas cooler by indirect heat exchange with boiler feed water, without plugging or fouling the tubes in the gas cooler. The two quench cooled gas streams are combined and scrubbed free from particulate matter, i.e., particulate carbon and ash with water to produce a clean product stream of synthesis gas having a high $H_2O$/dry gas mole ratio. Simultaneously, the stream of synthesis gas leaving the gas cooler is separately scrubbed free from particulate matter to produce a clean product stream of synthesis gas having a low $H_2O$/dry gas mole ratio. The streams of carbon-water-ash dispersion from all of the quench tanks and gas scrubbers are processed in a soot-recovery facility to produce separate streams of clarified water, ash, and a liquid dispersion of soot in water or in a liquid hydrocarbon carrier. All of this dispersion is then introduced into the first and/or second gas generator in admixture with the heavy liquid hydrocarbon fuel feed. Fouling and plugging of the tubes of a convection-type gas cooler associated with the third gas generator is prevented even though there is total carbon recycle in the process by decreasing the total metals in the feed to the third gas generator by eliminating the metals normally recycled in the soot.

BRIEF DESCRIPTION OF THE DRAWING

The invention will be further understood by reference to the accompanying drawing. The drawing is a schematic representation of a preferred embodiment of the process.

DESCRIPTION OF THE PREFERRED EMBODIMENTS

A more complete understanding of the invention may be had by reference to the accompanying drawing which illustrates one embodiment of the invention in which conventional free-flow noncatalytic refractory lined partial oxidation gas generators 1, 2 and 3 are simultaneously operated.

Synthesis gas generator 1 and/or 2 are fed with a fuel mixture from lines 4 and/or 5 which comprises a principal stream of heavy liquid hydrocarbon fuel containing high concentrations of metal compounds initially from line 6 and a liquid dispersion of soot in a liquid carrier from line 10 that was produced in a conventional soot recovery facility 11, as previously described. Actually, the heavy liquid hydrocarbon fuel in line 6 is pumped by means of pump 12 through line 13, heater 14 (optional), and lines 15 and 16 into mixer 17 where it is mixed with the liquid dispersion of soot from line 10. This dispersion may optionally include a portion of the hydrocarbon fuel from lines 39, 25, valve 26, and line 27. The fuel mixture in line 20 is directed to gas generator 1 through line 21, open valve 22, and lines 4 and 23. Valve 24 is closed. Optionally, the fuel mixture in line 20 may be simultaneously directed to gas generator 2 through line 30, open valve 31, and lines 5 and 32. Valve 33 is closed.

The fuel mixture from line 20 may be replaced in either one of gas generators 1 or 2, but not in both, with the principal fuel containing no liquid dispersion of soot. In such case to supply gas generator 1, valves 22 and 33 are closed, valve 24 is opened and the heavy liquid hydrocarbon fuel in line 15 is split and a portion is passed through lines 34–36, 4 and 23. Alternatively, to supply gas generator 2, valves 24 and 31 are closed, valve 33 is opened and the heavy liquid hydrocarbon fuel in line 15 is split and a portion is passed through lines 37, 38, 112 and 32.

Synthesis gas generator 3 is always fed with a portion of fresh heavy liquid hydrocarbon fuel feed from lines 15, 39, 40, and 41.

Since steam is preferred in all three of the gas generators in the system to moderate the exothermic reaction, a first portion of the steam produced in conventional convection-type gas cooler 45, associated with gas generator 3, is passed through lines 46, 47, and mixed in line 41 with the heavy liquid hydrocarbon fuel stream from line 40. This mixture of fuel and steam is passed into the reaction zone of synthesis gas generator 3 by way of one passage in burner 48 located in the upper head 49 of gas generator 3. Simultaneously, a steam of free-oxygen containing gas from line 42 is passed into gas generator 3 by way of line 43 and another passage of burner 48. A mixture of atomized fuel in the presence of steam and free-oxygen are reacted together by partial oxidation in reaction zone 51 lined with thermally resistant refractory 52. The hot raw synthesis gas steam passes down into gas-diversion chamber 53 where a small amount of entrained matter separates out. The separated material falls through refractory lined passage 54 into chamber 55 at the bottom. There it may be removed through line 56, valve 57, line 58.

All of the hot raw synthesis gas produced by gas generator 3 is passed through refractory lined transfer line 59 into conventional convection-type gas cooler 45 where it is cooled by indirect heat exchange with boiler feed water (BFW). The boiler feed water enters through line 60 and leaves as saturated or superheated steam through line 46. The steam in line 46 may be used as the temperature moderator in any one and preferably all of the gas generators 1, 2 and 3. A portion of the steam in line 46 may be optionally passed through line 61, valve 62, and line 63 for use elsewhere in the system.

The partially cooled synthesis gas leaves gas cooler 45 through line 67 at a temperature in the range of about 250° F. to 750° F., such as about 350° F. to 500° F. This is cleaned in gas scrubbing and separation column 68. The gas stream leaves by line 69 and is scrubbed free from entrained particulate carbon and ash in venturi scrubber 70 with water from line 71. The mixture of synthesis gas and water passes through line 72 into column 68. A clean product stream of synthesis gas having a low $H_2O$/dry gas mole ratio in the range of about 0.05 to 0.5, such as about 0.1 leaves column 68 through overhead line 73, valve 74, and line 75 at a temperature in the range of about 200° to °F., such as about 400° to 350° F. The pressure is substantially the same as that in gas generator 3 less ordinary pressure drop in the lines.

A stream of liquid dispersion of particulate carbon, water, and ash leaves gas scrubber and separator 68 through line 76, valve 77, line 78, and is mixed in line 79 with the stream of liquid dispersion of particulate carbon, water, and ash from line 80 to be described further in connection with gas generator 2. Further mixing takes place in line 85 with the stream of liquid dispersion of particulate carbon, water, and ash from line 86 to be described further in connection with gas generator 1.

The stream of liquid dispersion of particulate carbon, water, and ash in line 85 is processed in soot-recovery facility 11. Soot-recovery facility 11 may by any suitable conventional mode for separating clarified water and a portion of the ash from the liquid dispersion of particulate carbon, water, and ash to produce the liquid dispersion of soot in line 10. The clarified water stream leaves through line 87 and a portion may be recycled to quench tanks 88 and/or 89 located below synthesis gas generators 1 and 2 respectively by way of lines 90 and/or 91 respectively. Alternatively, another portion of the clarified water may be mixed with make-up water in lines 92 and/or 93 and recycled to venturi scrubbers 94 and 70. The stream of liquid dispersion of soot in a liquid carrier from the group liquid hydrocarbon fuel, water, and mixtures thereof is passed through line 10 into mixer 17, previously described. The soot comprises particulate carbon containing high metal values. The remainder of the metals and metal compounds leave the system through line 96 as the ash stream. Synthesis gas generator 2 is preferably fed with a portion of the steam from gas cooler 45 by way of lines 46 and 110–111. The steam is either mixed in line 112 with the stream of fuel feed from line 38 or mixed in line 32 with the stream of fuel feed from line 5. The steam-fuel mixture is passed into the reaction zone of synthesis gas generator 2 by way of lines 115–116, and another passage of burner 113. A mixture of atomized fuel in the presence of steam, and free-oxygen are reacted together by partial oxidation in reaction zone 117 to produce a hot raw synthesis gas stream containing unreacted particulate carbon and ash. Gas generator 2 is lined on the inside with thermally resistant refractory 118.

All of the hot raw synthesis gas passes down through refractory lined passage 119, dip tube 120, and into quench water 121 contained in the bottom of a conventional-type quench tank 89. The partially cleaned and quench cooled stream of synthesis gas with most of the particulate carbon and ash removed leaves quench tank 89 by way of line 125 and is mixed in line 126 with a second stream of partially cleaned quench cooled stream of synthesis gas from line 127, to be further described in connection with gas generator 1. The streams of synthesis gas in lines 125 and 127 are saturated with water and have a temperature in the range of about 300° to 600° F., such as about 400° to 500° F. The pressure is substantially that in each respective gas generator less ordinary pressure drop in the lines and equipment. The mixture of gases is passed into venturi scrubber 94 where it is scrubbed free of any remaining entrained particulate carbon and ash with water from line 92, water heater 128, and line 129. The mixture of synthesis gas and liquid dispersion comprising particulate carbon, water, and ash enters gas scrubbing and separation column 130 through line 131. Fresh rinse water enters through line 132. A clean product stream of synthesis gas having a high $H_2O$/dry gas mole ratio in the range of about 1.0 to 2.0, such as 1.5 leaves by way of line 133, valve 134 and line 135 at the top of separator 130. A liquid dispersion comprising particulate carbon, water and ash leaves through bottom line 136, valve 137 and line 138. By means of pump 139, the dispersion is pumped through lines 140 and 141 into soot recovery facility 11.

The liquid dispersion comprising particulate carbon, water, and ash in the bottom of quench tank 89 is passed through line 145, valve 146, line 147 and through heat exchanger 148 where it heats the scrubbing water from line 93. The heated scrubbing water passes through line 71 into venturi scrubber 70. The partially cooled dispersion in line 80 is mixed in line 79 with the dispersion comprising particulate carbon, water, and ash from line 78.

Synthesis gas generator 1 is preferably fed with a portion of the steam from gas cooler 45 by way of lines 46, 110 and 150. The liquid reactant fuel stream from line 4 and the stream of steam from line 150 are mixed in line 23. The steam-fuel mixture is passed into the reaction zone of synthesis gas generator 1 by way of one passage in burner 151 located in the upper head 152 of gas generator 1. Simultaneously, a stream of free-oxygen containing gas from line 42 is passed into gas generator 1 by way of lines 115 and 153, and another passage of burner 151. A mixture of atomized fuel in the presence of steam, and free-oxygen are reacted together by partial oxidation in reaction zone 154 to produce a hot raw synthesis gas stream containing unreacted particulate carbon and ash. Gas generator 1 is lined on the inside with thermally resistant refractory 155.

All of the hot raw synthesis gas passes down through refractory lined passage 156, dip tube 157, and into quench water 158 contained in the bottom of a conventional-type quench tank 88. The partially cleaned and quench cooled stream of synthesis gas with most of the particulate carbon and ash removed leaves quench tank 88 by way of line 127. As previously described, this gas stream is mixed in line 126 with the stream of partially cleaned quench cooled stream of synthesis gas from gas generator 2 in line 125. The gas mixture is then scrubbed with water in venturi 94, scrubbed with water again in column 130 from which the clean product stream of synthesis gas with a high $H_2O$/dry gas mole ratio is removed through lines 133 and 135, as previously mentioned in connection with gas generator 2.

The liquid dispersion comprising particulate carbon, water, and ash in the bottom of quench tank 88 is passed through line 159, valve 160, line 161, water heater 128 and line 86. As previously described, the stream of liquid dispersion in line 86 is mixed in line 85 with the stream of liquid dispersion from line 79 and the mixture is processed in soot-recovery facility 11.

Quench water 158 and 121 in quench tanks 88 and 89 respectively and the quenched gas streams leaving said quench tanks are at a temperature in the range of about 300° to 600° F. such as about 400° to 500° F. The temperature of the stream of synthesis gas in line 135 is in the range of about 300° to 600° F., such as about 400° to 500° F. In some cases heat exchangers 128 and/or 148 may be eliminated. The liquid dispersion or particulate carbon, water, and ash from the bottom of quench tanks 88, 89 and/or from the bottom of gas scrubbing and separation columns 130 and 68 may be removed by way of conventional lock-hoppers (not shown).

Advantageously, the flexibility of this system is such that either one or two streams of synthesis gas may be continuously produced and 100% soot recycle to extinction is ensured even though one of the gas generators may have to be shut down for any reason. For example, with synthesis gas generators 1, 2 and 3 of the same size, and each producing about 25 to 40 vol.%, such as about 37.5 vol.% of the plant-design total synthesis gas output, if gas generator 3 had to be shut down, then during standby gas generators 1 and 2 remaining in operation are capable of producing through quench one gas stream in the amount of up to about 75 vol.%, such as about 70–80 vol.% of the plant-design total synthesis gas output with no gas stream being cooled in a convection-type gas cooler. Alternatively, during standby of either of gas generators 1 and 2, the other two gas generators in operation are capable of producing one gas stream through quench in the amount of up to about 40 vol.%, such as about 35 to 40 vol.%, of the plant-design total synthesis gas output; and simultaneously producing one gas stream that is cooled in an associated convection-type gas cooler in the amount of up to about 40 vol.%, such as about 35 to 40 vol.% of the plant-design total synthesis gas output.

Partial oxidation gas generator 1 and 2 for producing the hot raw synthesis gas containing entrained particulate carbon and ash comprises a vertical unpacked free-flow noncatalytic cylindrical shaped steel pressure vessel lined with refractory, such as shown in coassigned U.S. Pat. No. 2,809,104. A typical quench drum is also shown in said patent. Partial oxidation gas generator 3 with a chamber for particulate matter and a gas cooler for producing hot raw synthesis gas is shown in coassigned U.S. Pat. No. 3,565,588. A burner, such as shown in coassigned U.S. Pat. No. 2,928,460, may be used to introduce the feed streams into the reaction zone of the gas generators. These coassigned U.S. patents are incorporated herein by reference. The atomic ratio of free oxygen to carbon in the fuel (O/C ratio), is in the range of about 0.6 to 1.6, and preferably about 0.8 to 1.4. The exothermic partial oxidation reaction takes place in the presence of a temperature moderator selected from the group steam, water, $CO_2$, $N_2$, cooled and cleaned recycled synthesis gas and mixtures thereof. When steam or water is used as a temperature moderator, the $H_2O$/fuel weight ratio in the reaction zone is in the range of about 0.1 to 5, and preferably about 0.2 to 0.7. The partial oxidation reaction takes place in the reaction zone of the partial oxidation gas generator at an autogenous temperature in the range of about 1,700° to 3,500° F., such as in the range of about 2,000° to 2,800° F., and a pressure in the range of about 5 to 300 atmospheres, such as about 15 to 200 atmospheres.

The composition of the hot, raw effluent gas stream directly leaving the reaction zone of the partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.05 to 5.0 wt.%, such as 0.1 to 1.0 wt.% (basis total weight of fuel feed) when no soot dispersion from line 10 is mixed with the heavy hydrocarbon fuel feedstock (as in lines 34 and 39), and in the range of about 0.2 to 20.0 wt.% when the soot dispersion from line 10 is in admixture with the heavy hydrocarbon fuel (as in line 20).

Depending on the composition after removal of the entrained particulate carbon and ash by quench cooling and/or scrubbing with water and with or without dewatering, the gas stream may be employd as synthesis gas, reducing gas, or fuel gas.

The heavy liquid hydrocarbon fuel containing high metal concentrations which is used as the principal fuel feed in partial oxidation gas generators 1, 2 or 3 is generally unsatisfactory for use as a fuel for many purposes because of the corrosive nature of the ash. The corrosiveness of the ash is due primarily to the oxidation products of the naturally-occuring metal compounds. Advantageously, by the subject process these comparatively low cost fuels may now be used as a source for synthesis gas. These heavy liquid hydrocarbon fuels have a density in degrees API of 10 or less, and an initial boiling point of greater than 400° F. Such as in the range of about 400° to 600° F., say 450° to 500° F., when measured at atmospheric pressure in accordance with standard test methods of the American Society For Testing and Materials.

Naturally occurring metalic compounds or principally vanadium, nickel and iron, and traces of chromium and molybdenum, if any, including oil-soluble materials, colloidally dispersed metallic compounds and complex organometallic compounds, are present in these heavy liquid hydrocarbon fuels. The metals and compounds are present in combined amounts ranging from about 10 parts per million (ppm) to over 5000 ppm, such as about 50 to 2000 ppm, say over 250 ppm (basis weight of the fuel). The reaction products of said metal constituents leave the reaction zone of the gas generator as metallic, oxide and sulfide ash particles entrained in the effluent gas stream.

A portion of the ash, i.e. about 5.0 to 75 wt.% (basis weight of ash) is separated from quench cooling and scrubbing water in the conventional soot recovery facility 11, for example by sedimentation. The remainder of the ash is recycled to the gas generator along with the liquid dispersion of soot. The liquid carrier in the soot dispersion is selected from the group water, liquid hydrocarbon fuel, and mixtures thereof. The solids content is in the range of about 0.1 to 8.0 wt.%, such as about 1.0 to 6.0 wt.%, and comprises a combination of particulate carbon and ash. About 5.0 to 50 wt.% of the soot comprises the metals Ni, V, and Fe and their reaction products; and the remainder is carbon.

Heavy liquid hydrocarbon fuel containing high metal concentrations suitable for use in the subject process may be selected from the group consisting of crude residua from petroleum distillation and cracking process operations, petroleum distillate, reduced crude, whole crude, asphalt, coal tar, coal derived oil, shale oil, tar sand oil, and mixtures thereof. Pumpable slurries of solid carbonaceous fuel, e.g. particulate carbon, petroleum coke, and mixtures thereof in a vaporizable carrier, such as water, liquid hydrocarbon fuel and mixtures thereof are included within the definition of said heavy liquid hydrocarbon fuel.

The free-oxygen containing gas employed in the subject process is selected from the group consisting of air, oxygen-enriched air, i.e., greater than 21 mole % $O_2$, and substantially pure oxygen, i.e. greater than 95 mole % $O_2$. The temperature moderator is selected from the group consisting of steam, water, $CO_2$-rich gas, nitrogen, and recycled synthesis gas.

EXAMPLE

The following example illustrates a preferred embodiment of this invention pertaining to the continuous operation of a partial oxidation process employing heavy hydrocarbon fuel feedstocks containing high metal concentrations and total soot recycle without plugging and fouling the tubes of a downstream convection-type gas cooler.

While preferred modes of operation are illustrated, the Example should not be construed as limiting the scope of the invention. The process is continuous and the flow rates are specified on an hourly basis for all streams of materials.

Synthesis gas generators 1, 2 and 3 are each about the same size. Each gas generator is sized to produce about 35 to 40 vol.% of the plant-design total synthesis gas output. The feedstream to gas generators 1 and 2 are the same and each comprises the following: 161,382 lbs. of a vacuum resid having a gravity of 2.0 degrees API and an Ultimate Analysis in weight percent as follows: C 83.45, H 10.10, N 0.35, S 5.5, and O 0.6 and containing the following metals in parts per million (ppm) V 594, Ni 98, and Fe 64 in admixture with 4,148 lbs. of recycled unreacted carbon in a liquid dispersion comprising 5.0 wt.% of soot with metals in a liquid carrier comprising said vacuum resid. Thus, the fuel mixture in line 4 is mixed with 65,474 lbs. of steam from line 150 and gas cooler 145 at a temperature of 574° F. and a pressure of 1,165 psig. The mixture is passed through a passage in burner 151, at a temperature of 560° F. and a pressure of 1,120 psig. Simultaneously, the fuel mixture in line 5 is mixed with 65,474 lbs. of steam from line 111 and the mixture is passed through a passage in burner 113, at a temperature of 560° F. and a pressure of 1,120 psig. Burners 151 and 113 are respectively located in the upper ends of conventional vertical refractory lined free-flow noncatalytic unpacked synthesis gas generators 1 and 2.

Simultaneously, two separate streams of substantially pure oxygen i.e., 99.5 mole % $O_2$ each stream in the amount of 172,794 lbs., and at a temperature of 300° F. and a pressure of 1,165 psig. are passed respectively through other passages in said burners. The partial oxidation and other related reactions then take place in the separate reaction zones of gas generators 1 and 2. Two separate streams of raw synthesis gas, each of 8.74 million standard cubic feet (SCF measured at 60° F., 14.7 psig.) respectively leave the reaction zones of gas generators 1 and 2 at a temperature of 2,557° F. and a pressure of 1050 psig. The composition of the raw synthesis gas in chambers 154 and 117 is shown in Column 1 of Table I. About 2,794 lbs. of unreacted particulate carbon and 1,101 lbs. of ash are entrained in the raw synthesis gas. The term 'ash' includes all of the reaction products of the metal compounds in the fuel feed to the gas generators.

All of each hot raw gas stream leaving reaction zones 154 and 117 is separately introduced into quench water contained in the bottoms of quench tanks 88 and 89 respectively. Substantially all of the entrained particulate matter, i.e., particulate carbon and ash being produced is carried into the quench water. The two streams of raw synthesis gas are thereby separately cooled and cleaned by the quench water. Supplemental scrubbing of the combined quench gas streams with water in venturi scrubber 94 and in scrubbing and separating column 130 are then provided to produce the clean product stream of synthesis gas with a high $H_2O$/dry gas mole ratio of 1.57. This product stream of synthesis gas in line 135 comprises 40.65 million SCF and has the composition shown in Column 2 of Table I.

Simultaneously, 164,304 lbs. of a feedstream of vacuum resid from line 39 at a temperature of 574° F. and a pressure of 1,165 psig. in admixture with 63,838 lbs. of steam from line 47 and gas cooler 45 is passed through one passage of burner 48 located in the upper end of conventional vertical refractory lined free-flow noncatalytic unpacked synthesis gas generator 3. A feedstream comprising 167,612 lbs. of substantially pure oxygen i.e., 99.5 mole % $O_2$ from line 43 at a temperature of 300° F. and a pressure of 1,165 psig. is passed through another passage of burner 48. The feedstreams impinge, mix, and the partial oxidation and other related reactions then take place in the reaction zone of gas generator 3. A stream of 8.59 million standard cubic feet (SCF) (measured at 60° F., 14.7 psig.) of raw synthesis gas leaves the reaction zone of gas generator 3 at a temperature of 2,504° F. and a pressure of 1,050 psig. The composition of the raw synthesis gas in chamber 53 is shown in Column 3 of Table I. About 2,706 lbs. of unreacted particulate carbon and 165 lbs. of ash are entrained in the stream of raw synthesis gas.

All of the raw effluent gas stream leaving reaction zone 51 comprising 8.59 million SCF of raw synthesis gas is passed through insulated passage 59 and cooled in gas cooler 45 to produce about 12,460 lbs. of saturated steam at a temperature of about 590° F.

The partially cooled gas stream leaving gas cooler 45 is scrubbed with water to produce 8.60 million SCF of clean synthesis gas with a low $H_2O$/dry gas mole ratio of 0.093. This product stream of synthesis gas in line 75 has the composition shown in Column 4 of Table I.

The water dispersion of particulate matter is removed from quench tanks 88 and 89 and from gas scrubbing and separating towers 130 and 68 and processed in conventional soot recovery facility 11. About 1,046,250 lbs. of clarified water (line 87), 1,078 lbs. of ash (line 96), and 211,300 lbs. of a soot-vacuum resid dispersion (line 10) are obtained. The water is recycled to the quench tanks and scrubbers, the ash is removed and sent to a metals recovery plant for separating by-product vanadium and nickel, and the soot-vacuum resid dispersion is mixed with the heavy hydrocarbon fuel and recycled to gas generators 1 and 2 as a portion of the fuel, as previously described.

TABLE I
GAS COMPOSITION

| COMPOSITION MOLE % | Column No. 1 / Drawing Reference No. 154 & 117 | Column No. 2 / Drawing Reference No. 135 | Column No. 3 / Drawing Reference No. 53 | Column No. 4 / Drawing Reference No. 75 |
|---|---|---|---|---|
| CO | 44.72 | 19.22 | 44.25 | 44.34 |
| $H_2$ | 39.69 | 17.07 | 40.23 | 40.31 |
| $CO_2$ | 4.30 | 1.84 | 4.21 | 4.22 |
| $H_2O$ | 9.51 | 61.10 | 9.53 | 9.71 |
| $CH_4$ | 0.36 | 0.15 | .36 | .36 |
| Ar | 0.12 | 0.05 | .12 | .12 |
| $N_2$ | 0.09 | 0.04 | .09 | .09 |
| $H_2S$ | 1.15 | 0.50 | 1.15 | 1.15 |
| COS | 0.00 | 0.03 | .06 | .06 |
| Metals and Metal Compounds (PPM) | 2720 | — | 420 | — |

By the subject invention, even though there is total carbon recycle in the process the metals content of the raw gas stream continuously entering the convection-type gas cooler 45 may be limited to a value which will not exceed the corresponding metals content of the fresh hydrocarbon fuel feedstock. Build-up of metal deposits and fouling of boiler tubes may be thereby prevented and the life of the gas cooler extended.

Advantageously, the subject system provides for flexible operation and equipment back-up. In the event one of the gas generator has to be shut down, for example for maintenance, a large proportion of the plant-design total synthesis gas output, i.e. about 70–80 vol.% can be continuously produced by the other two gas generators. By means of the subject system, two product streams of synthesis gas with high and low $H_2O$/dry gas mole ratios respectively may be simultaneously produced from low cost fuels containing a high metals content and total recycle of all soot produced in the system and with no substantial plugging or fouling of a convection-type gas cooler in the system.

The process of the invention has been described generally and by examples with reference to heavy hydrocarbon fuel and synthesis gas having particular compositions for purposes of clarity and illustration only. It will be apparent to those skilled in the art from the foregoing that various modifications of the process disclosed herein can be made without departure from the spirit of the invention.

We claim:

1. A partial oxidation process comprising:
   (1) producing a plurality of separate hot raw streams of synthesis gas comprising $H_2$, CO, $CO_2$, particulate carbon, ash, and at least one material from the group $H_2O$, $CH_4$, $H_2S$, COS, $N_2$ and Ar in a plurality of separate partial oxidation gas generating means by the partial oxidation of heavy liquid hydrocarbon fuel feedstock containing high metal concentrations;
   (2) cooling each of the hot raw streams of synthesis gas from (1) in a separate gas cooling zone that is associated with each of said gas generating means; wherein the hot raw synthesis gas stream from at least one gas generating means is cooled in a quench zone with water to produce at least one first clean stream of raw synthesis gas saturated with water and at least one separate stream of liquid dispersion comprising carbon, water and ash; and, wherein the hot raw synthesis gas stream from at least one other gas generating means is cooled in a convection-type gas cooling zone to produce at least one second separate clean stream of raw synthesis gas containing less water than that in said first stream of raw synthesis gas;
   (3) scrubbing with water all of the quench cooled synthesis gas from (2) in a scrubbing zone to produce a clean product stream of synthesis gas with a high $H_2O$/dry gas mole ratio, and a separate stream of liquid dispersion comprising particulate carbon, water, and ash; and in a separate scrubbing zone scrubbing with water all of the synthesis gas from (1) that was cooled in said convection-type gas cooling zone;
   (4) introducing the separate streams of liquid dispersion comprising particulate carbon, water and ash from (2) and (3) into a soot-recovery zone to produce separate streams of clarified water, ash and a liquid dispersion comprising soot and water;
   (5) recycling separate portions of said clarified water from (4) to the quench zones in (2) and to the separate scrubbing zones in (3); and
   (6) mixing the stream of liquid dispersion comprising soot and water from (4) with fresh heavy liquid hydrocarbon fuel feedstock containing high metal concentration and introducing said mixture as the feed to at least one of the gas generating means in (1) that produces a hot raw synthesis gas stream which is cooled with water in a quench zone in (2).

2. A partial oxidation process comprising:
   (1) reacting a first reactant fuel comprising a heavy liquid hydrocarbon fuel feedstock containing high metal concentrations in admixture with a liquid dispersion comprising soot rich in metal values in a liquid carrier with a free-oxygen containing gas in the presence of a temperature moderator at an autogenous temperature in the range of about 1700° to 3500° F. and a pressure in the range of about 5 to 300 atmospheres in the reaction zone of a first and/or second free-flow noncatalytic partial oxidation gas generator to produce a hot, raw stream of synthesis gas comprising $H_2$, CO, $CO_2$, particulate carbon, ash, and at least one material from the group $H_2O$, $CH_4$, $H_2S$, COS, and Ar;

(2) quench cooling and scrubbing with water in separate quench zones all of the hot raw synthesis gas stream from each gas generator in (1), and removing from each quench zone a partially cleaned synthesis gas stream and a stream of liquid dispersion comprising particulate carbon, water, and ash;

(3) reacting a second reactant fuel comprising a heavy hydrocarbon fuel feedstock containing high metal concentrations with a free-oxygen containing gas in the presence of a temperature moderator at an autogenous temperature in the range of about 1700° F. to 3500° F. and a pressure in the range of about 5 to 300 atmospheres in the reaction zone of a third free-flow noncatalytic partial oxidation gas generator, and in the reaction zone of either one of the gas generators in (1) not receiving said first reactant fuel feedstream, to produce a hot raw stream of synthesis gas comprising $H_2$, CO, $CO_2$, particulate carbon, ash, and at least one material from the group $H_2O$, $CH_4$, $H_2S$, COS, $H_2$ and Ar;

(4) cooling in a convection-type gas cooler all of the hot raw stream of synthesis gas from (3), scrubbing the partially cooled gas stream with water, and separating a clean product stream of synthesis gas with a low $H_2O$/dry gas mole ratio from a stream of liquid dispersion of particulate carbon, water, and ash;

(5) mixing together the partially cleaned synthesis gas streams from (2), scrubbing the combined streams with water, and separating a clean product stream of synthesis gas with a high $H_2O$/dry gas mole ratio from a stream of liquid dispersion comprising particulate carbon, water, and ash;

(6) combining the streams of liquid dispersion comprising particulate carbon, water, and ash from (2), (4), and (7); and separating in a soot-recovery zone separate streams of clarified water, ash, and a liquid dispersion comprising soot in a liquid carrier; and (7) mixing all of the liquid dispersion comprising soot in a liquid carrier from (6) with a fresh stream of heavy liquid hydrocarbon fuel feedstock containing high metal concentrations, and introducing said mixture into the first and/or second partial oxidation gas generator in (1) as said first reactant fuel feedstream.

3. The process of claim 2 wherein synthesis gas generators 1, 2 and 3 are substantially of the same size, and about 30 to 35 volume percent of the plant-design total synthesis gas output is produced by each gas generator 1, 2 and 3.

4. The process of claim 2 wherein the $H_2O$/dry gas mole ratio of the clean product stream of synthesis gas from (4) is in the range of about 0.05 to 0.5.

5. The process of claim 2 wherein the $H_2O$/dry gas mole ratio of the clean product stream of synthesis gas from (5) is in the range of about 1.0 to 2.0.

6. The process of claim 2 provided with the steps of passing boiler feed water in indirect heat exchange with the hot raw synthesis gas stream passing through the convection-type gas cooler in (4) to produce steam, and introducing said steam into one, two, or all three of said gas generators as said temperature moderator.

7. The process of claims 1 or 2 in which said heavy hydrocarbon fuel feedstock containing high metal concentrations is selected from the group consisting of crude residua from petroleum distillation and cracking process operations, petroleum distillate, reduced crude, whole crude, asphalt, coal tar, coal derived oil, shale oil, tar sand oil, and mixtures thereof.

8. The process of claims 1 or 2 in which said hydrocarbonaceous feedstock comprises a pumpable slurry of solid carbonaceous fuel, selected from the group consisting of particulate carbon, petroleum coke, and mixtures thereof, in a vaporizable liquid carrier, such as water, liquid hydrocarbon fuel, and mixtures thereof.

9. The process of claim 1 or 2 in which said temperature moderator is selected from the group consisting of steam, water, $CO_2$-rich gas, nitrogen, and recycled synthesis gas.

10. The process of claim 1 or 2 in which said free-oxygen containing gas is selected from the group consisting of air, oxygen-enriched air, i.e. greater than 21 mole % $O_2$, and substantially pure oxygen, i.e. greater than about 95% mole oxygen.

* * * * *

UNITED STATES PATENT AND TRADEMARK OFFICE
CERTIFICATE OF CORRECTION

PATENT NO. : 4,411,671
DATED : October 25, 1983
INVENTOR(S) : C.P. MARION and F.C. JAHNKE It is certified that error appears in the above—identified patent and that said Letters Patent is hereby corrected as shown below:

In the Abstract, Line 13    Change "as" to -- a --

Signed and Sealed this

Fourteenth Day of February 1984

[SEAL]

Attest:

GERALD J. MOSSINGHOFF

Attesting Officer    Commissioner of Patents and Trademarks